Oct. 18, 1932.   J. C. BOGLE   1,883,243
BURNER CONTROL APPARATUS AND SYSTEM
Filed April 11, 1929
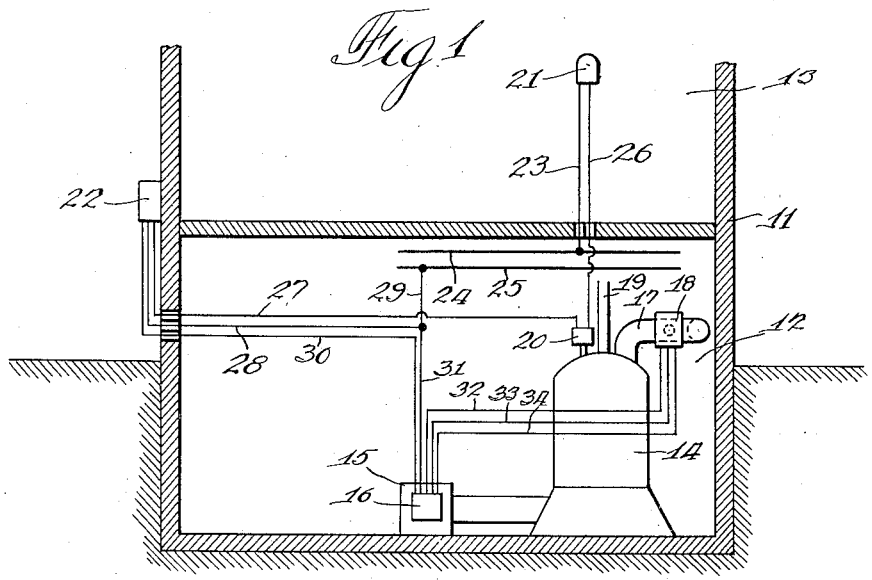
Inventor.
John C. Bogle.
By Jones, Addington, Ames & Seibold
Attys.
Witness
David S. Susensson Patented Oct. 18, 1932

1,883,243

UNITED STATES PATENT OFFICE

JOHN C. BOGLE, OF RIVER FOREST, ILLINOIS, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

BURNER CONTROL APPARATUS AND SYSTEM

Application filed April 11, 1929. Serial No. 354,323.

This invention relates to burner control apparatus and systems, and has particular relation to apparatus and systems for controlling the operation of automatic heating systems such as systems including oil burners, gas burners, or the like.

It has been found that certain difficulties arise in operating automatically controlled heating systems during relatively mild weather when the amount of heat required to be supplied by the furnace or burner is of a comparatively small value. In order to maintain substantially constant temperatures in the space to be heated, two general systems of automatic control have been developed. These are the intermittent system and the graded fire system.

In the intermittent system the fire at the burner is continuously maintained during the periods of operation at its point of maximum efficiency. The heating system is so designed that this size of fire is ample to maintain the desired temperature within the space to be heated during periods of the lowest expected outside temperature. At higher temperatures the periods of operation of the heating system are shortened so that the amount of heat supplied to the space to be heated is decreased to a value that is substantially proportionate to the total heat which may be supplied by the system when operated continuously for a predetermined interval of time, in the ratio of the time of operation of the system to the total length of such predetermined interval of time.

This system of control has proved quite satisfactory when the outdoor temperature is relatively low so that the required periods of operation of the heating system are of considerable duration. However, when the outdoor temperature rises to a point relatively close to the temperature which it is desired to maintain in the space to be heated, the heat required to be supplied from the heating system is so low that it may be supplied by very short periods of operation of the system at widely separated intervals. If such operation could be effected, the desired results would be obtained, but the heat-storage capacity of the furnace and the heating medium is so great that the ordinary heating system that is controlled solely in accordance with the temperature prevailing in the space to be heated is subject to considerable "overtravel." In other words, at the time the temperature of the space to be heated has reached the desired value and the operation of the heating system is accordingly terminated, the heat stored in the system is sufficient to effect a considerable further rise of temperature.

Systems have been proposed wherein the size of the fire would be varied in accordance with the quantity of heat which the system is required to supply under any given conditions. While such systems may be practicable under some conditions, they involve unsatisfactory operating conditions under the same conditions of outdoor temperature that give rise to the above mentioned difficulty in automatically controlling an intermittent heating system. Under these conditions, namely, when the outside atmosphere is quite warm, the size of the fire in a graded fire system would have to be reduced to such a point that the heating system could not operate at all efficiently. For example, the size of a fire might be successfully graded from its maximum value to a value perhaps half as great, but it would be obviously impractical to reduce the size of the fire to such an extent that the heat supplied thereby would be only one-twentieth of the maximum capacity of the burner, as might be necessary in case the outdoor temperature were only a few degrees below the desired temperature in the space to be heated.

The present invention has for its primary object the provision of a system of control for an automatic heating system of the intermittent type, whereby the above-described disadvantages may be overcome.

The within-disclosed means for accomplishing the object stated comprises, in general, a device for determining the duration of the intervals of operation of a heating system and for determining the intervals of time elapsing between successive periods of operation, in accordance with the outdoor temperature.

The invention will be better understood, and other objects and advantages thereof will appear, from a consideration of the following detailed description in connection with the accompanying drawing, in which:

Figure 1 is a diagrammatic representation of a heating system embodying the invention, illustrating a portion of a dwelling house or other building in vertical section, and showing the general arrangement of suitable electrical circuits for controlling the system;

Fig. 2 is a front elevational view of a controlling device whereby the desired operation of the system is obtained; and Fig. 3 is a schematic representation of the control circuit for the heating system shown in Fig. 1.

Referring first to Fig. 1, a dwelling house or other building 11 comprises a basement or cellar 12, within which the furnace and associated parts of the heating system are disposed, and a living room or other space 13 that is to be heated by such system. A furnace 14 is provided with a burner (not shown) of any suitable type that is adapted to be controlled by apparatus 15, which may comprise a motor-driven pump for supplying the liquid fuel to the burner, a magnetically operated valve for controlling a supply of combustible gas to a gas burner, or any other device required for the controlling of a burner of any well known type.

The apparatus 15 has associated therewith suitable controlling apparatus indicated generally at 16. A stack 17 is associated with the furnace 14 for the purpose of conducting the gaseous products of combustion away from the furnace, and a control device 18 of any desired type is associated with the stack 17 to control the operation of the heating system in accordance with conditions of combustion obtaining in the furnace 14, as is customary in modern practice. A pipe or conduct 19 is shown extending from the furnace 14 and is provided for conducting the heating medium from the furnace to the space to be heated.

A controlling device 20 is suitably associated with the furnace 14 to control the operation of the heating system in accordance with conditions of the furnace, such as boiler pressure, temperature, or the like, and a controlling device 21 is disposed within the space 13 that is to be heated for the purpose of controlling the operation of the heating system to maintain as nearly as possible the desired temperature in said space. Another controlling device 22 is located outside the building 11, where it may be secured to a wall of said building, or supported in any other suitable manner as will be readily understood. The location of the controlling device 22 is such that it will be protected from damage by the elements but will be continuously subjected to the temperature prevailing immediately outside the building.

A conductor 23 is connected to a conductor 24 constituting one of two current supply mains 24 and 25 and extends to the controlling device 21, which may suitably comprise a switch that is opened and closed in response to variations in temperature within the space 13. A conductor 26 extends from the other side of the controlling device 21 to one side of the controlling device 20, and the other side of the latter device is connected through a conductor 27 to the controlling device 22. A conductor 28 which also extends to the controlling device 22 is connected through a conductor 29 to the other conductor 25 of the current supply mains, and a third conductor 30 extends from the controlling device 22 to the controlling apparatus 16. A conductor 31 extends from the controlling apparatus 16 and is connected through the conductor 29 to the conductor 25 of the current supply mains, and conductors 32, 33 and 34 extend between the controlling apparatus 16 and the stack-controlled device 18.

Referring now to Fig. 2, it will be seen that the controlling device 22 comprises a suitable casing 35 within which an insulating or other auxiliary base 36 is secured by screws 37. One end of a bimetallic thermostatic element 38 is secured to a member 39 carried by the auxiliary base 36, and the other end of the thermostatic element 38 carries an electric switch 40 which is here illustrated as being of the mercury contactor type, although an open-contact switch or any other type of switch may be utilized, if desired. An electrical heating element 41 is also carried by the latter extremity of the thermostatic element 38 and is disposed in juxtaposition thereto in order that the heating effect of the element 41 will be readily transferred to the said thermostatic element. The element 38 is illustrated in such position that the switch 40 is closed, and this position corresponds to a relatively cool condition of said thermostatic element. When the temperature of this element is raised to a predetermined degree, the right-hand or free extremity thereof is deflected downwardly to such an extent that the switch 40 is opened.

The conductors 27, 28 and 30, referred to in connection with Fig. 1, are respectively connected to terminals 42, 43 and 44 carried by the auxiliary base 36. The terminals of the switch 40 are connected through conductors 45 and 46, including flexible lead portions 45a and 46a, to the terminals 42 and 44, respectively, and the terminals of the electrical heating element 41 are connected through flexible leads or conductors 47 and 48 to the terminals 43 and 44, respectively. It will be understood that the casing 35 will be provided with a suitable cover for protecting the apparatus enclosed thereby from damage by the elements and that said casing will also be provided with suitable means for attaching the device to a wall of the building or other support.

The operation of the system will now be readily understood by referring to the schematic circuit diagram of Fig. 3, from which it will be seen that the conductor 24 of the current supply mains is connected to the controlling apparatus 16 through the conductor 23, controlling device 21, conductor 26, controlling device 20, conductors 27 and 45, switch 40 and conductors 46 and 30, all connected in series, while the other current supply main 25 is directly connected to the controlling apparatus 16 through the conductors 29 and 31. In this manner current is supplied to the apparatus 16 for effecting operation of the heating system. The supplementary control of the stack-controlled device 18 is effected through the conductors 32, 33 and 34 which extend directly from said device 18 to the controlling apparatus 16. The electrical heating element 41 of the device 22 is connected directly in parallel with the controlling apparatus 16 so that the periods of energization of this heating element are concurrent with those of the controlling apparatus 16.

In accordance with conventional practice, the control circuit for the heating system is completed by the controlling device 21 when the temperature or other conditions obtaining in the space 13 are such that heat is required from the furnace. The controlling device 20 may also operate in the conventional manner, but since the mode of operation of this device has no direct bearing upon the present invention, no detailed comment with respect thereto is required herein, it being understood that this device is illustrated simply to exemplify the method of associating the present invention with an automatically controlled heating system of any well known type.

It will be seen now that the circuit to the controlling apparatus 16 is completed through the switch 40 of the device 22, which switch is closed because the thermostatic element 38 is relatively cool. Thus, the controlling apparatus 16 is initially energized in response to the operation of the device 21 and operation of the heating system is thus initiated and continues under the control of the devices 18, 20 and 21 and any suitable safety or sequence controlling devices which may be embodied in the apparatus 16 according to the requirements of the particular application or installation.

As the operation of the heating system continues, the concurrent energization of the electrical heating element 41 gradually raises the temperature of the thermostatic element 38 and the free right-hand extremity thereof is gradually deflected downwardly in accordance with this increase in temperature. If the outdoor temperature, to which the thermostatic element 38 is exposed, is above a predetermined value, the rise in temperature of the element 38, due to the heating of the element 41, will eventually be sufficient to deflect the element 38 until the switch 40 is opened, whereupon the operation of the heating system is terminated.

The length of time required for the opening of the switch 40 after the initial energization of the element 41 will vary inversely as a function of the excess of the outdoor temperature above a predetermined minimum value. The characteristics of the thermostatic element 38 and the heating element 41 are such that the maximum temperature rise of the element 38 in response to the heating of the element 41 is limited to a definite value which will not cause the switch 40 to be opened if the outdoor temperature is below the said predetermined minimum value. For example, if the thermostatic element 38 must attain a temperature of 90° F. in order to open the switch 40, and if the maximum temperature rise of the element 38 which may be effected by the heating element 41 is 50° F., then the switch 40 will never be opened unless the outdoor temperature to which the element 38 is exposed is 40° F. or above, because the additive effect of the heat supplied to the element 38 from the outside atmosphere and that supplied to it by the electrical heating element 41 will then be less than the temperature required to deflect the element 38 sufficiently to open the switch 40. The higher the outdoor temperature is above the predetermined minimum value, the shorter is the time required for the electrical heating element 41 to supply sufficient heat to the element 38 to effect opening of the switch 40, and in this manner the maximum duration of the periods of operation of the heating system is determined by the device 22 as an inverse function of the excess of the outdoor temperature above the predetermined minimum value.

By regulating the operation of the heating system in this manner, the desired results are obtained, since it has already been shown herein that these results may be accomplished by shortening the periods of operation of the system as the outdoor temperature is increased. Moreover, the heat-storage capacity of the thermostatic element 38 and the heating element 41 are such that after the switch 40 has been opened in response to a predetermined deflection of the element 38, this switch is maintained in its open position for a considerable interval of time by reason of the slow cooling of the element 38.

The time required for the heat stored in the elements 38 and 41 to be dissipated to such an extent that the temperature of the element 38 falls to a point where the switch 40 is reclosed varies as an inverse function of the deficiency of the outdoor temperature below the temperature which will cause the element 38 to maintain the switch 40 in open position. This mode of operation is exactly what is required to accomplish the desired results, because a greater time delay between successive periods of the operation of the heating system is desired for higher outdoor temperatures, in order that the heat stored in the furnace and in the heating medium may be supplied to and distributed about the space to be heated during the interval of such delay.

It will be seen that the design of the parts of the controlling device 22 in such manner that the thermostatic element is affected to comparable extents by the outdoor temperature and by the heating of the electrical heating element 41, permits the intermittent periods of operation of the heating system to be accurately regulated in accordance with the outdoor temperature. Since the amount of heat drained from the structure or enclosure for the space to be heated is a direct function of the difference between the desired inside temperature and the outside temperature, the regulation of the periods of operation of the heating system in this manner prevents excessive "overtravel" of the system which would be occasioned by controlling the system solely by a space-temperature-responsive device, such as the device 21 illustrated herein.

It will be understood that the system and apparatus disclosed herein are merely exemplary of the manner of utilizing the present invention, and that this invention may be applied in a heating system of any desired type that is controlled by any kind of a control circuit. The control circuit disclosed herein is merely one of a suitable design and is illustrated in a conventional manner only because the present invention is not in any sense limited to the details thereof.

Having thus shown and described a preferred embodiment of the invention, what is claimed as new and is desired to secure by Letters Patent is:

1. In a system for heating an enclosed space, automatic means for effecting intermittent operation of said system, and means responsive to a temperature prevailing outside said space for determining the length of such intermittent periods of operation.

2. In a system for heating an enclosed space, automatic means for effecting intermittent operation of said system, and means responsive to the prevailing temperature outside and immediately surrounding the enclosure for said space for determining the length of such intermittent periods of operation.

3. In a system for heating an enclosed space, automatic means for effecting intermittent operation of said system, and means responsive to a temperature prevailing outside said space for determining the length of such intermittent periods of operation and for insuring a substantial time delay between such periods of operation.

4. In a system for heating an enclosed space, automatic means for effecting intermittent operation of said system, and means responsive to the prevailing temperature outside and immediately surrounding the enclosure for said space for determining the length of such intermittent periods of operation and for insuring a substantial time delay between such periods of operation.

5. In a system for heating an enclosed space, automatic means for effecting intermittent operation of said system, and means responsive to a temperature prevailing outside said space for determining the length of such intermittent periods of operation and for insuring a time delay between such periods of operation, the length of which delay is governed by said outside temperature.

6. In a system for heating an enclosed space, automatic means for effecting intermittent operation of said system, and means responsive to the prevailing temperature outside and immediately surrounding the enclosure for said space for determining the length of such intermittent periods of operation and for insuring a time delay between such periods of operation, the length of which delay is governed by said outside temperature.

7. In a system for heating an enclosed space, automatic means, including means responsive to a temperature prevailing within said space, for effecting intermittent operation of said system, and means responsive to a temperature prevailing outside said space for determining the length of such intermittent periods of operation.

8. In a system for heating an enclosed space, automatic means, including means responsive to a temperature prevailing within said space, for effecting intermittent operation of said system, and means responsive to the prevailing temperature outside and immediately surrounding the enclosure for said space for determining the length of such intermittent periods of operation.

9. In a system for heating an enclosed space, automatic means, including means responsive to a temperature prevailing within said space, for effecting intermittent operation of said system, and means responsive to a temperature prevailing outside said space for determining the length of such intermittent periods of operation and for insuring a substantial time delay between such periods of operation.

10. In a system for heating an enclosed space, automatic means, including means responsive to the temperature prevailing within said space, for effecting intermittent operation of said system, and means responsive to the prevailing temperature outside and immediately surrounding the enclosure for said space for determining the length of such intermittent periods of operation and for insuring a substantial time delay between such periods of operation.

11. In a system for heating an enclosed space, automatic means, including means responsive to the temperature prevailing within said space, for effecting intermittent operation of said system, and means responsive to a temperature prevailing outside said space for determining the length of such intermittent periods of operation and for insuring a time delay between such periods of operation, the length of which delay is governed by said outside temperature.

12. In a system for heating an enclosed space, automatic means, including means responsive to a temperature responsive within said space, for effecting intermittent operation of said system, and means responsive to the prevailing temperature outside and immediately surrounding the enclosure for said space for determining the length of such intermittent periods of operation and for insuring a time delay between such periods of operation, the length of which delay is governed by said outside temperature.

13. In a system for heating an enclosed space, means responsive to a temperature prevailing within said space for always controlling the initiation of operation of said system, and means responsive to a temperature prevailing outside said space throughout each period of operation of the system for terminating the operation of said system.

14. In an intermittently operating system for heating an enclosed space, means responsive to a temperature prevailing within said space for initiating the operation of said system, and means responsive to a temperature prevailing outside said space throughout each period of operation of the system for determining the maximum length of each period of operation of said system.

15. In an intermittently operating system for heating an enclosed space, means responsive to a temperature prevailing within said space for initiating the operation of said system, and means responsive to a temperature prevailing outside said space throughout each period of operation of the system for determining the minimum length of time elapsing between successive periods of operation of said system.

16. In an intermittently operating system for heating an enclosed space, means responsive to a temperature prevailing within said space for initiating the operation of said system, and means responsive to a temperature prevailing outside said space throughout each period of operation of the system for determining the maximum length of each period of operation of said system and for determining the minimum length of time elapsing between successive periods of operation of said system.

17. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced by said electrical heating element and also by a temperature prevailing outside said enclosed space, and a switch controlled by said thermostatic element and connected in series with said control circuit.

18. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced by said electrical heating element and also by the prevailing temperature outside and immediately surrounding the enclosure for said space, and a switch controlled by said thermostatic element and connected in series with said control circuit.

19. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced by said electrical heating element and also by the prevailing temperature outside and immediately surrounding the enclosure for said space, and a switch connected in series with said control circuit and actuated by said thermostatic element to open position when the temperature of said thermostatic element is above a predetermined value and to closed position when the temperature of said thermostatic element is below a predetermined value.

20. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit.

21. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermostatic element being such that said switch is opened after said control circuit has been energized for an interval of time varying as an inverse function of the excess of said ambient temperature above a predetermined value.

22. In a system for heating an enclosed space, an electrical control circuit including means for effecting operation of said system when said circuit is completed, means for normally completing said circuit in response to a predetermined condition which is regulated by said control circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermostatic element being such that said switch is opened after said control circuit has been energized for an interval of time varying as an inverse function of the excess of said ambient temperature above a predetermined value, below which value said switch remains closed continuously.

23. In a system for heating an enclosed space, an electrical control circuit including means for effecting operation of said system when said circuit is completed, means for normally completing aid circuit in response to a predetermined condition which is regulated by said control circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermostatic element being such that said switch is opened after said control circuit has been energized for an interval of time varying as an inverse function of the excess of said ambient temperature above a predetermined value, and the heat-storage capacity of said electrical heating element and said thermostatic element being such that the reclosing of said switch is delayed for a substantial interval of time, varying as an inverse function of the deficiency of said ambient temperature below a predetermined value.

24. In a system for heating an enclosed space, an electrical control circuit including means for effecting operation of said system when said circuit is completed, means for normally completing said circuit, an electrical heating element energized when said circuit is completed, a thermostatic element influenced by said electrical heating element and also by a temperature prevailing outside said enclosed space, and a switch controlled by said thermostatic element and connected in series with said control circuit.

25. In a system for heating an enclosed space, an electrical control circuit including means for effecting operation of said system when said circuit is completed, means for normally completing said circuit, an electrical heating element energized when said circuit is completed, a thermostatic element influenced by said electrical heating element and also by the prevailing temperature outside and immediately surrounding the enclosure for said space, and a switch controlled by said thermostatic element and connected in series with said control circuit.

26. In a system for heating an enclosed space, an electrical control circuit including means for effecting operation of said system when said circuit is completed, means for normally completing said circuit, an electrical heating element energized when said circuit is completed, a thermostatic element influenced by said electrical heating element and also by the prevailing temperature outside and immediately surrounding the enclosure for said space, and a switch connected in series with said control circuit and actuated by said thermostatic element to open position when the temperature of said thermostatic element is above a predetermined value and to closed position when the temperature of said thermostatic element is below a predetermined value.

27. In a system for heating an enclosed space, an electrical control circuit including means for effecting operation of said system when said circuit is completed, means for normally completing said circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit.

28. In a system for heating an enclosed space, an electrical control circuit including means for effecting operation of said system when said circuit is completed, means for normally completing said circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermostatic element being such that said switch is opened after said control circuit has been energized for an interval of time varying as an inverse function of the excess of said ambient temperature above a predetermined value.

29. In a system for heating an enclosed space, an electrical control circuit including means for effecting operation of said system when said circuit is completed, means for normally completing said circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermostatic element being such that said switch is opened after said control circuit has been energized for an interval of time varying as an inverse function of the excess of said ambient temperature above a predetermined value, below which value said switch remains closed continuously.

30. In a system for heating an enclosed space, an electrical control circuit including means for effecting operation of said system when said circuit is completed, means for normally completing said circuit, an electrical heating element energized when said circuit is completed, a thermostatic element influenced to comparable extents by the heating of said electrical heating element and by the ambient temperature immediately outside the enclosure for said space, and a switch controlled by said thermostatic element and connected in series with said control circuit, the heating effect of said electrical heating element upon said thermosatic element being such that said switch is opened after said control circuit has been energized for an interval of time varying as an inverse function of the excess of said ambient temperature above a predetermined value, and the heat-storage capacity of said electrical heating element and said thermostatic element being such that the reclosing of said switch is delayed for a substantial interval of time, varying as an inverse function of the deficiency of said ambient temperature below a predetermined value.

In witness whereof, I have hereunto subscribed my name.

JOHN C. BOGLE.